United States Patent
Kawamura (10) Patent No.: US 9,731,751 B2
(45) Date of Patent: Aug. 15, 2017

(54) STEERING SYSTEM

(71) Applicant: JTEKT CORPORATION, Osaka-shi, Osaka (JP)

(72) Inventor: Hiroshi Kawamura, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/065,209

(22) Filed: Mar. 9, 2016

(65) Prior Publication Data

US 2016/0272237 A1    Sep. 22, 2016

(30) Foreign Application Priority Data

Mar. 16, 2015 (JP) .................................. 2015-052000

(51) Int. Cl.
*B62D 5/04* (2006.01)
*B62D 15/02* (2006.01)

(52) U.S. Cl.
CPC ............. *B62D 5/04* (2013.01); *B62D 5/0463* (2013.01); *B62D 5/0469* (2013.01); *B62D 15/021* (2013.01)

(58) Field of Classification Search
CPC ...... B62D 5/04; B62D 5/0463; B62D 5/0469; B62D 15/021
USPC .......................................................... 701/41
See application file for complete search history.

(56) References Cited

U.S. PATENT DOCUMENTS

| | | | |
|---|---|---|---|
| 2007/0137924 A1* | 6/2007 | Kawada | B62D 5/046 180/446 |
| 2008/0067960 A1* | 3/2008 | Maeda | B62D 5/046 318/400.02 |
| 2010/0057300 A1* | 3/2010 | Nishiyama | B62D 5/0469 701/42 |
| 2016/0065114 A1* | 3/2016 | Von Wendorff | B62D 5/0484 318/400.22 |

(Continued)

FOREIGN PATENT DOCUMENTS

| | | |
|---|---|---|
| EP | 2159133 A1 | 3/2010 |
| JP | 2011168168 A | 9/2011 |

(Continued)

OTHER PUBLICATIONS

Aug. 23, 2016 Extended Search Report issued in European Patent Application No. 16159814.9.

*Primary Examiner* — Yazan Soofi
(74) *Attorney, Agent, or Firm* — Oliff PLC (57) ABSTRACT

A steering system includes a steering mechanism, a motor that is a source of an assist force, and a battery that supplies a voltage to the motor. The system includes a voltage sensor that detects a power supply voltage, a steering sensor that detects a steering angle, and a motor control signal generation circuit that calculates a q-axis voltage command value to allow the motor to generate the assist force and that generates a motor control signal based on the q-axis voltage command value. The system includes a steering-angular-velocity limiting circuit that calculates a compensation amount for compensation for the q-axis voltage command value and that derives the compensation amount by calculating a power supply compensation component based on the power supply voltage when the absolute value of the steering angle is equal to or larger than a predetermined steering angle close to a maximum steering angle.

7 Claims, 7 Drawing Sheets

(56) References Cited

U.S. PATENT DOCUMENTS

2016/0200355 A1* 7/2016 Mori ................... B62D 5/0484
                                                        180/446
2016/0272237 A1* 9/2016 Kawamura ............. B62D 5/04

FOREIGN PATENT DOCUMENTS

JP          5556219 B2    7/2014
WO     2015/011996 A1    1/2015

* cited by examiner

STEERING SYSTEM

INCORPORATION BY REFERENCE

The disclosure of Japanese Patent Application No. 2015-052000 filed on Mar. 16, 2015 including the specification, drawings and abstract, is incorporated herein by reference in its entirety.

BACKGROUND OF THE INVENTION

1. Field of the Invention

The invention relates to a steering system.

2. Description of the Related Art

Steering systems are available which enable involvement in control of steering of a steering wheel and turning of steered wheels by allowing a motor to generate a torque to assist a steering mechanism that turns the steered wheels based on the steering of the steering wheel. In some of such steering systems, the involvement in control is enabled so as to mitigate impact when a so-called end abutment occurs, in which a steering angle of the steering wheel reaches a maximum steering angle, i.e., steering end (for example, Japanese Patent No. 5556219 (JP 5556219 B)).

In JP 5556219 B, the impact of end abutment is controllably mitigated by setting a limiting angular velocity for a steering angular velocity of steering generated on the steering wheel when the steering angle is close to the maximum steering angle. Specifically, the limiting angular velocity is calculated so that the limiting angular velocity decreases with an increase in the steering angle when the steering angle is equal to or larger than a predetermined steering angle close to the maximum steering angle. In JP 5556219 B, a compensation amount proportional to the difference between the limiting angular velocity and the steering angular velocity is calculated to compensate for (correct) a voltage command value.

In JP 5556219 B, the voltage command value is compensated for based on an input of the steering angular velocity. However, the voltage command value itself, which is to be compensated for, may increase or decrease as a result of a fluctuation in the voltage of a power supply (for vehicles, the power supply voltage of a battery). Thus, when the compensation for the voltage command value is implemented under proportional control in view of following capability of the motor to the voltage command value, the following situation may occur. For example, when the power supply voltage rises to a value larger than an initially designed and estimated value to increase the voltage command value itself, which is to be compensated for, even with the calculation for a reduction in the limiting angular velocity, the increase in the steering angular velocity corresponding to the increase in the voltage command value remains as a steady-state deviation. On the other hand, when the limiting angular velocity is designed to be low, in view of such influence of the power supply voltage, at the initial design and estimation stage, the range of adjustment of the limiting angular velocity is narrowed, reducing the degree of freedom of the design.

SUMMARY OF THE INVENTION

An object of the invention is to provide a steering system that allows a voltage command value to be suitably compensated for regardless of fluctuation in a power supply voltage.

A steering system in an aspect of the invention includes a steering mechanism that steers steered wheels based on steering of a steering wheel, a motor that allows the steering mechanism to generate a turning torque that turns the steered wheels, and a power supply that serves as a source of a voltage applied to the motor. The steering system further includes a power supply voltage detection circuit that detects a power supply voltage of the power supply, a steering angle detection circuit that detects a steering angle formed at the steering mechanism, a calculation circuit that calculates a voltage command value to allow the motor to generate a predetermined turning torque, a motor control signal generation circuit that generates a motor control signal to apply a portion of the power supply voltage, which is indicated by the voltage command value, to the motor. The steering system further includes a compensation circuit that calculates a compensation amount including at least a power supply compensation component as one of a plurality of components for compensation for the voltage command value, the compensation circuit deriving the compensation amount by executing calculation for the power supply compensation component based on the power supply voltage when the steering angle is equal to or larger than a predetermined steering angle that is close to a maximum steering angle.

In the steering system, the voltage command value may be affected by a fluctuation in the power supply voltage. In the above-described configuration, even with a fluctuation in the power supply voltage, when a steering angle detected by the steering angle detection circuit is at least equal to or larger than the predetermined steering angle that is close to a maximum steering angle, the adverse effect of the fluctuation in the power supply voltage on the voltage command value can be suppressed by compensation (correction) based on the power supply compensation component.

Consequently, when a compensation component different from the power supply compensation component (for example, a limiting angular velocity) is used to mitigate impact of end abutment, even if the power supply voltage fluctuates to increase the voltage command value itself, for example, the power supply compensation component can be added as a compensation amount corresponding to the increase in the voltage command value. In this case, for example, adjustment can be made to provide a compensation amount needed to obtain a compensation result expected before the voltage command value is increased. This restrains a steady-state deviation corresponding to the increase in the voltage command value from remaining. This also eliminates the need to take the adverse effect of a fluctuation in the power supply voltage into account at an initial design and estimation stage, suppressing a decrease in the degree of freedom of design. Therefore, the voltage command value can be suitably compensated for regardless of a fluctuation in the power supply voltage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
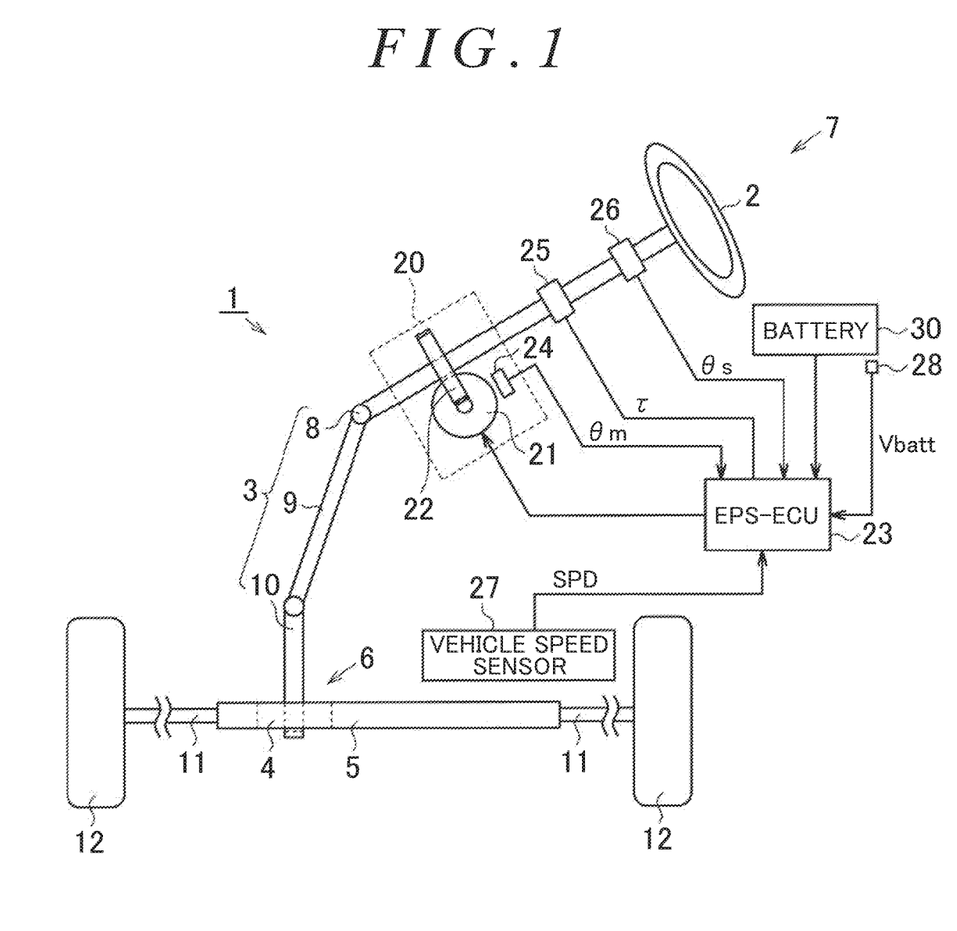
FIG. 1 is a diagram schematically depicting an electric power steering system.

An in-vehicle electric power steering system (hereinafter referred to as an EPS) that is an embodiment of the invention will be described below. As depicted in FIG. 1, the EPS 1 includes a steering mechanism 7 that turns steered wheels based on a driver's steering operation, an EPS actuator 20 that assists the driver's steering operation, and an EPSECU 23 that controls operation of the EPS actuator 20.

The steering mechanism 7 includes a steering wheel 2 operated by the driver and a steering shaft 3 that rotates together with the steering wheel 2. The steering shaft 3 includes a column shaft 8 coupled to the center of the steering wheel 2, an intermediate shaft 9 coupled to a lower end of the column shaft 8, and a pinion shaft 10 coupled to a lower end of the intermediate shaft 9. A lower end of the pinion shaft 10 meshes with a rack shaft 5 (to be exact, a portion 4 with rack teeth) extending in a direction crossing the pinion shaft 10. Therefore, rotary motion of the steering shaft 3 is converted into reciprocating linear motion of the rack shaft 5 by a rack-and-pinion mechanism 6 including the pinion shaft 10 and the rack shaft 5. Such reciprocating linear motion is transmitted to right and left steered wheels 12, 12 via tie rods 11 coupled to opposite ends of the rack shaft 5. Thus, steered angles of the steered wheels 12, 12 are changed.

The EPS actuator 20 is a column type EPS actuator including a motor 21 that is a source of an assist force acting as a turning torque that turns the right and left steered wheels 12, 12. A brushless motor is adopted as the motor 21. The motor 21 is coupled to the column shaft 8 via a speed reducing mechanism 22. The speed reducing mechanism 22 reduces the speed of rotation output from the motor 21 and transmits a turning force corresponding to the resultant rotation speed to the column shaft 8. That is, the torque of the motor 21 is applied to the steering shaft 3 as an assist force to assist the driver's steering operation.

The EPSECU 23 acquires detection results from various sensors provided in a vehicle as information indicative of the driver's request or a traveling state. The EPSECU 23 controls the motor 21 in accordance with the various pieces of information acquired.

The various sensors include, for example, a rotation angle sensor 24, a torque sensor 25, a steering sensor 26, a vehicle speed sensor 27, and a voltage sensor 28. The rotation angle sensor 24 functions as a steering-angular-velocity detection circuit and is provided in the motor 21 to detect a rotation angle θm of the motor 21.

The torque sensor 25 is provided on the column shaft 8 to detect a steering torque τ. The steering sensor 26 functions as a steering angle detection circuit, and is provided on an upstream side of the column shaft 8 with respect to the torque sensor 25 (closer to the steering wheel 2) to detect a steering angle θs. The vehicle speed sensor 27 detects a vehicle speed (a traveling speed of the vehicle) SPD. The voltage sensor 28 functions as a power supply voltage detection circuit and is provided on a battery 30 to detect a power supply voltage Vbatt. The battery 30 is a DC power supply that is charged with power from an alternator not depicted in the drawings. The battery 30 is connected to the EPSECU 23 so as to be able to supply power to the EPSECU 23.

The EPSECU 23 calculates a control target value for the assist force based on the rotation angle θm, the steering torque τ, the steering angle θs, and the vehicle speed SPD. The EPSECU 23 then supplies the motor 21 with driving power needed to allow the EPS actuator 20 to generate the control target value.

Now, functions of the EPSECU 23 will be described in detail.

Figure 2:
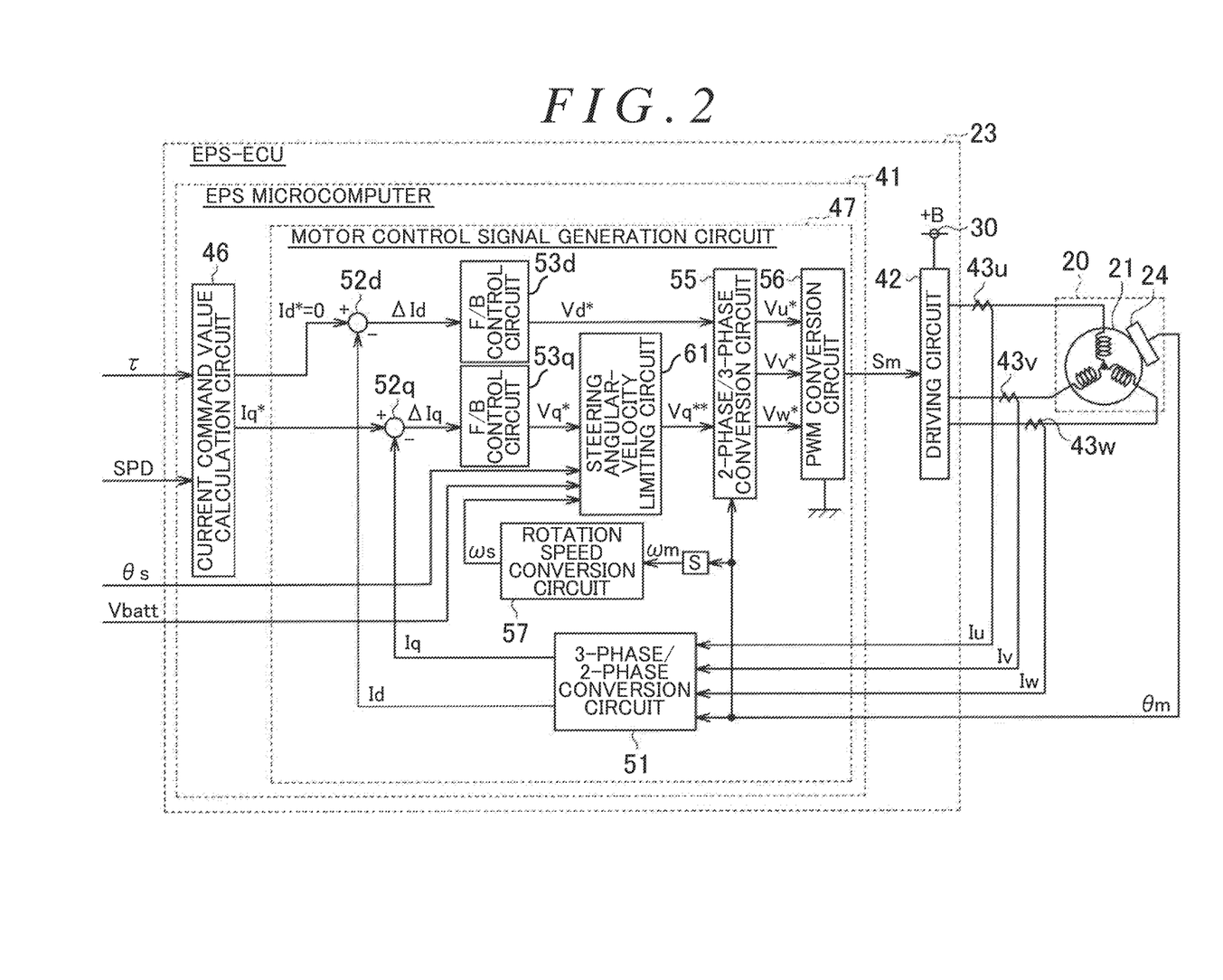
FIG. 2 is a block diagram depicting a control configuration of EPSECU in the electric power steering system.

As depicted in FIG. 2, the EPSECU 23 includes an EPS microcomputer 41 that is a microprocessing unit or the like. The EPS microcomputer 41 outputs a motor control signal Sm such as a PWM signal. The EPSECU 23 includes a driving circuit 42 such as an inverter circuit which performs a driving operation to feed driving power from the battery 30 (+B) to the motor 21 based on the motor control signal Sm.

The driving circuit 42 is a well-known inverter including three arms connected together in parallel and corresponding to the respective phases, in which a basic unit (arm) is a pair of switching elements (FET) connected together in series. The motor control signal Sm output by the EPS microcomputer 41 defines an on-duty ratio for each of the switching elements included in the driving circuit 42. When the motor control signal Sm is applied to gate terminals of the switching elements to turn on or off the switching elements in response to the motor control signal Sm, the voltage of the battery 30 is converted into three-phase driving power, which is then supplied to the motor 21.

The EPSECU 23 connects to current sensors 43$u$, 43$v$, and 43$w$ configured to detect values of phase currents Iu, Iv, and Iw conducted through the motor 21. The EPS microcomputer 41 in the EPSECU 23 calculates the motor control signal Sm that is output to the driving circuit 42, based on the phase current values Iu, Iv, and Iw for the motor 21, and the above-described rotation angle θm, steering torque τ, steering angle θs, and vehicle speed SPD.

That is, the EPS microcomputer 41 includes a current command value calculation circuit 46 that calculates a current command value as a control target value for the assist force applied to the steering mechanism 7, and a motor control signal generation circuit 47 that also functions as a calculation circuit that generates the motor control signal Sm allowing operation of the driving circuit 42 to be controlled.

The current command value calculation circuit 46 calculates a q-axis current command value Iq* in a d/q coordinate system based on the steering torque τ and the vehicle speed SPD. In addition to the q-axis current command value Iq* output from the current command value calculation circuit 46, the phase current values Iu, Iv, and Iw and the rotation angle θm are input to the motor control signal generation circuit 47. For a d-axis current command value Id*, Id*=0 is calculated in the motor control signal generation circuit 47. The motor control signal generation circuit 47 generates the motor control signal Sm by performing current feedback control on the d/q coordinate system based on the phase current values Iu, Iv, and Iw and the rotation angle θm (electrical angle).

Specifically, in the motor control signal generation circuit 47, the phase current values Iu, Iv, and Iw are input to a 3-phase/2-phase conversion circuit 51 along with the rotation angle θm and converted into a d-axis current value Id and a q-axis current value Iq in the d/q coordinate system. The resultant q-axis current value Iq is input to a subtractor 52q along with the q-axis current command value Iq*. On the other hand, the d-axis current value Id resulting from the conversion along with the q-axis current value Iq is input to a subtractor 52d along with the d-axis current command value Id*. The subtractors 52d and 52q calculate a d-axis current deviation ΔId and a q-axis current deviation ΔIq, respectively. The resultant d-axis current deviation ΔId and q-axis current deviation ΔIq are input to F/B control circuits 53d and 53q, respectively.

The F/B control circuits 53d and 53q perform feedback control to allow the d-axis current command value Id* and the q-axis current command value Iq*, which are control target values for the F/B control circuits 53d and 53q, to trace the d-axis current value Id and the q-axis current value Iq, which represent actual currents. The F/B control circuits 53d and 53q calculate a d-axis voltage command value Vd* and a q-axis voltage command value Vq* by performing proportional control in which the input d-axis current deviation ΔId and q-axis current deviation ΔIq are multiplied by a predetermined F/B gain (proportional gain).

The q-axis voltage command value Vq* is input to a steering-angular-velocity limiting circuit 61 described later, and the steering-angular-velocity limiting circuit 61 calculates a compensation q-axis voltage command value Vq. The compensation q-axis voltage command value Vq is input to a 2-phase/3-phase conversion circuit 55 along with the d-axis voltage command value Vd* and the rotation angle θm and thus converted into phase voltage command values Vu*, Vv*, and Vw* for three phases.

The resultant phase voltage command values Vu*, Vv*, and Vw* are input to a PWM conversion circuit 56. The PWM conversion circuit 56 generates duty command values corresponding to the respective phase voltage command values Vu*, Vv*, and Vw*, and generates the motor control signal Sm having an on-duty ratio indicated by the duty command values. The EPS microcomputer 41 outputs the resultant motor control signal Sm to the driving circuit 42 to control the operation of the driving circuit 42, that is, supply of the driving power to the motor 21.

The EPS microcomputer 41 includes a rotational-angular-velocity conversion circuit 57 that converts a motor rotational angular velocity ωm resulting from differentiation of the rotation angle θm detected by the rotation angle sensor 24 into a steering angular velocity ωs of steering generated on the steering wheel 2. The resultant steering angular velocity ωs is input to the steering-angular-velocity limiting circuit 61 described later. The power supply voltage Vbatt detected by the voltage sensor 28 is input to the EPS microcomputer 41.

Now, functions of the steering-angular-velocity limiting circuit 61 will be described in further detail.

The steering-angular-velocity limiting circuit 61 functions as a compensation circuit, and has a function to perform increase-turning operation to increase the absolute value of the steering angle at a high steering angular velocity to mitigate impact applied to the steering mechanism 7 as a result of collision of the rack shaft 5 against a rack housing (not depicted in the drawings), that is, the impact of end abutment, when the steering operation corresponds to a steering angle close to the maximum steering angle (steering end). To accomplish this function, the steering-angular-velocity limiting circuit 61 has a function to arithmetically determine the compensation q-axis voltage command value Vq** based on the q-axis voltage command value Vq*.

Figure 3:
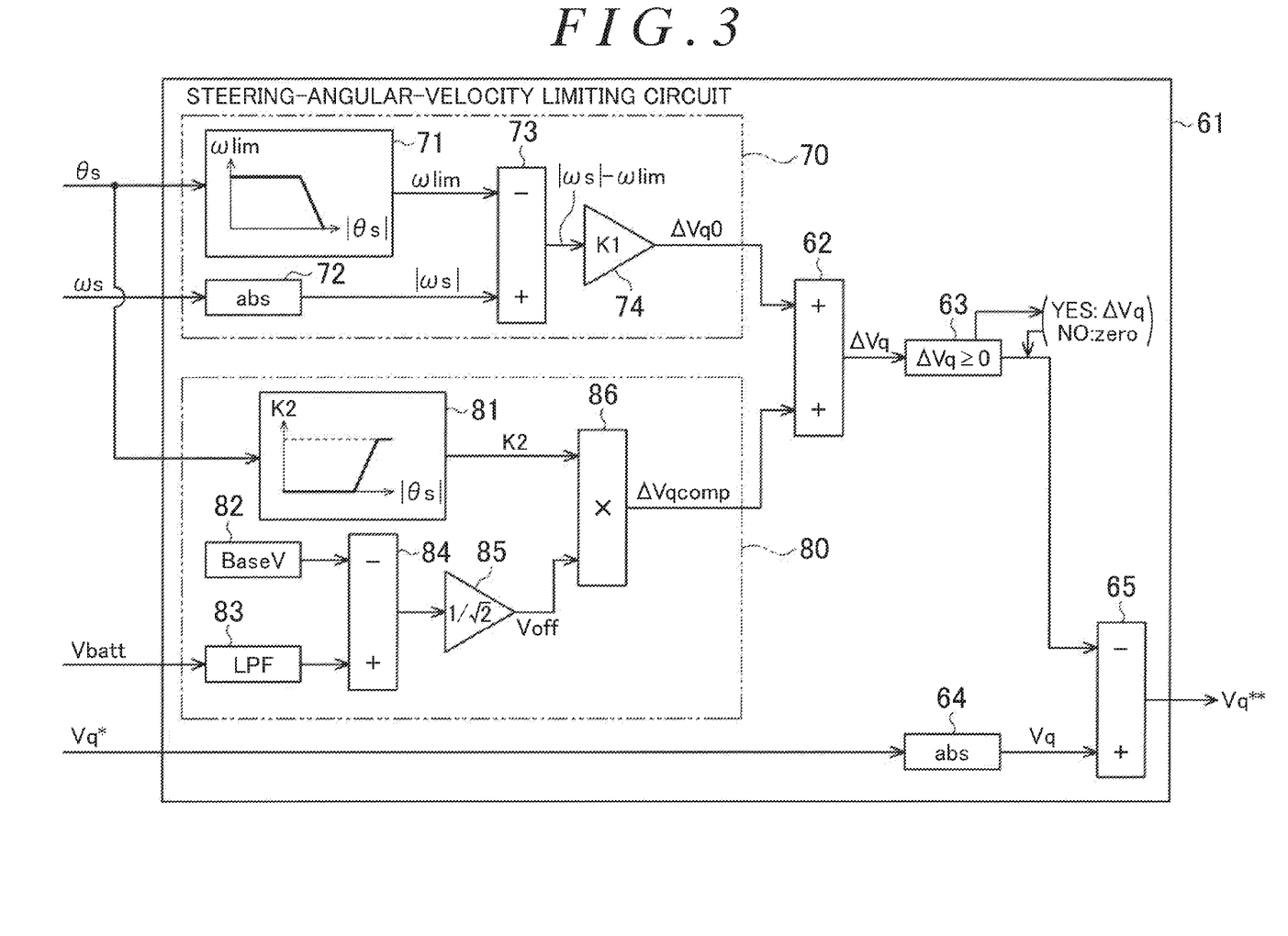
FIG. 3 is a block diagram depicting a control configuration of a steering-angular-velocity limiting circuit in the electric power steering system.

As depicted in FIG. 3, the steering-angular-velocity limiting circuit 61 has various calculation circuits 62 to 65 used for processing executed in the steering-angular-velocity limiting circuit 61, a basic-component generation circuit 70 that generates a compensation basic component ΔVq0 included in the compensation q-axis voltage command value Vq, and a power supply compensation component generation circuit 80 that generates a power supply compensation component ΔVqcomp included in the compensation q-axis voltage command value Vq.

The basic-component generation circuit 70 receives inputs of the steering angle θs and the steering angular velocity ωs. The basic-component generation circuit 70 functions as a limiting-angular-velocity calculation circuit. Upon receiving the input of the steering angle θs, the basic-component generation circuit 70 calculates the limiting angular velocity ωlim based on a steering angle-limiting angular velocity map 71, and outputs the limiting angular velocity ωlim to a subtraction input of a calculation circuit 73 with a subtraction function.

Figure 4:
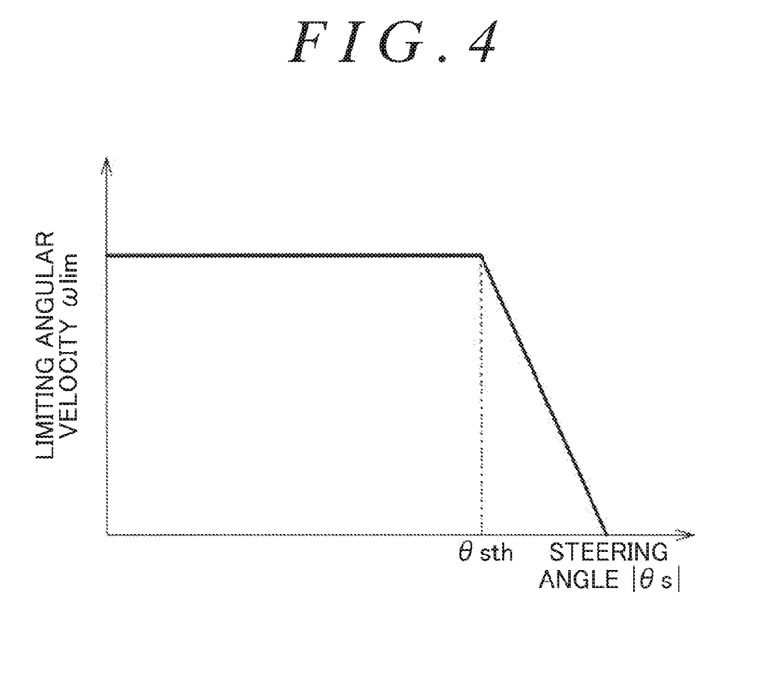
FIG. 4 is a diagram depicting a steering angle-limiting angular velocity map.

As depicted in FIG. 4, the steering angle-limiting angular velocity map 71 represents a relationship between the absolute value of the steering angle θs and the limiting angular velocity ωlim. The steering angle-limiting angular velocity map 71 is set such that, when the absolute value of the steering angle θs is equal to or larger than a predetermined steering angle θsth that is close to the maximum steering angle within a possible range of steering angles, the limiting angular velocity ωlim decreases based on an increase in the steering angle θs. For the predetermined steering angle θsth, a value is set which is empirically determined to be appropriate to mitigate impact exerted at the time of end abutment involved in the steering operation.

When the steering angular velocity ωs is input to the basic-component generation circuit 70, a calculation circuit 72 with a function to perform conversion into an absolute value calculates the absolute value |ωs| of the steering angular velocity ωs and outputs the absolute value |ωs| to an addition input of the calculation circuit 73. The calculation circuit 73 calculates a difference (|ωs|−ωlim) between the absolute value |ωs| and the limiting angular velocity ωlim and outputs a result of the calculation to a calculation circuit 74 with a multiplication function. The calculation circuit 74 multiplies the difference (|ωs|−ωlim) between the absolute value |ωs| and the limiting angular velocity ωlim by a compensation gain K1, and outputs a result of the multiplication to the calculation circuit 62 with an addition function as the compensation basic component ΔVq0.

The power supply compensation component generation circuit 80 receives the inputs of the steering angle θs and the power supply voltage Vbatt. Upon receiving the input of the steering angle θs, the power supply compensation component generation circuit 80 calculates a compensation gain K2 based on a steering angle-compensation gain map 81 and outputs the compensation gain K2 to a calculation circuit 86 with a multiplication function.

Figure 5:
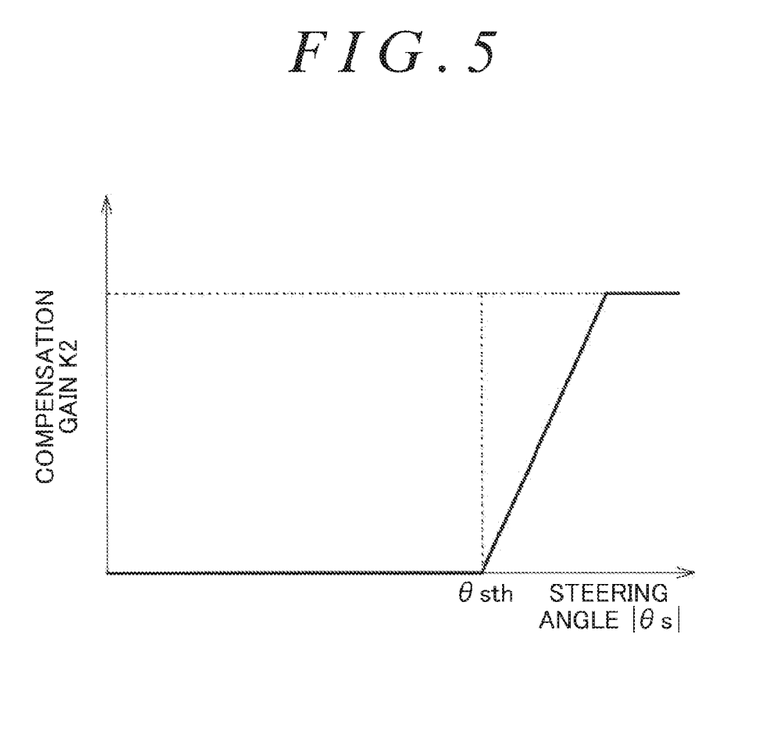
FIG. 5 is a diagram depicting a steering angle-compensation gain map.

As depicted in FIG. 5, the steering angle-compensation gain map 81 represents a relationship between the absolute value of the steering angle θs and the compensation gain K2. The steering angle-compensation gain map 81 is set such that, when the absolute value of the steering angle θs is equal to or larger than the predetermined steering angle θsth, which is close to the maximum steering angle, within the possible range of steering angles, the compensation gain K2 increases based on an increase in the steering angle θs. For the predetermined steering angle θsth, a value is set which is empirically determined to be appropriate to mitigate impact exerted at the time of end abutment involved in the steering operation and which is the same as the corresponding value in the steering angle-limiting angular velocity map 71.

The power supply compensation component generation circuit 80 also functions as a difference voltage detection circuit. When the power supply voltage Vbatt is input to the power supply compensation component generation circuit 80, a low pass filter (LPF) 83 with a function to average (smooth) slight fluctuations filters the power supply voltage Vbatt so as to correct fluctuations in the voltage into steady-state changes, and outputs the resultant power supply voltage Vbatt to an addition input of a calculation circuit 84 with a subtraction function. A predetermined reference voltage (BaseV) 82 is input to a subtraction input of the calculation circuit 84. The reference voltage 82 is set to a value (in this case, 12 V) empirically estimated for a situation during engine idling. That is, the reference voltage 82 is set to be the voltage of the battery 30 obtained during engine idling or in a situation similar to engine idling due to low speed traveling of the vehicle, that is, when the engine of the vehicle is rotating at a relatively low speed and a steering operation corresponding to the maximum steering angle (end abutment) is possible.

The calculation circuit 84 calculates a difference voltage between the power supply voltage Vbatt resulting from filtering and the reference voltage 82 (Vbatt−BaseV, that is, the amount of offset of the power supply voltage Vbatt from the reference voltage 82), and outputs the difference voltage to a calculation circuit 85 with a multiplication function. The calculation circuit 85 multiplies the difference voltage (Vbatt−BaseV) by a conversion coefficient to convert the difference voltage into a q-axis offset voltage Voff in the d/q coordinate system, and the q-axis offset voltage Voff to a calculation circuit 86. For the conversion coefficient, as in the case where multiplication by the square root of ⅔ is executed to represent a voltage based on 3-phase power as a voltage based on power in the d/q coordinate system, multiplication by the square root of ½ is executed to represent a voltage based on the battery 30 (DC power supply) as a voltage based on power in the d/q coordinate system. The calculation circuit 86 multiplies the q-axis offset voltage Voff by the compensation gain K2 and outputs a result of the multiplication to the calculation circuit 62 as the power supply compensation component ΔVqcomp.

Then, the calculation circuit 62 in the steering-angular-velocity limiting circuit 61 calculates the sum (ΔVq0+ΔVqcomp) of the compensation basic component ΔVq0 derived by the basic-component generation circuit 70 and the power supply compensation component ΔVqcomp derived by the power supply compensation component generation circuit 80, and outputs a result of the calculation to the ΔVq determination calculation circuits 63 as a compensation amount ΔVq. When the compensation amount ΔVq is equal to or larger than zero (ΔVq≥0) (YES), the ΔVq determination calculation circuit 63 outputs the compensation amount ΔVq to the calculation circuit 65 with a subtraction function without processing the compensation amount ΔVq. On the other hand, when the compensation amount ΔVq is smaller than zero (ΔVq<0) (NO), the ΔVq determination calculation circuit 63 outputs, to a subtraction side of the calculation circuit 65, a compensation amount ΔVq of zero, that is, data indicating that no compensation needs to be performed.

When the q-axis voltage command value Vq* is input to the steering-angular-velocity limiting circuit 61, the calculation circuit 64 with an absolute-value conversion function calculates the absolute value Vq of the q-axis voltage command value Vq* and outputs the absolute value Vq to an addition input of the calculation circuit 65. The calculation circuit 65 calculates a difference between the absolute value Vq and the compensation amount ΔVq (Vq−ΔVq), and outputs a result of the calculation to the 2-phase/3-phase conversion circuit 55 as the compensation q-axis voltage command value Vq**.

As described above, the basic-component generation circuit 70 determines the status of the steering operation based on the steering angle θs, and derives the compensation basic component ΔVq0 as a compensation amount that allows the steering angular velocity ωs to be adjusted to a steering angular velocity that is suitable for the situation and.

The power supply compensation component generation circuit 80 determines the status of the steering operation based on the steering angle θs, and derives the power supply compensation component ΔVqcomp as a compensation amount that allows the effect of fluctuations on the reference voltage 82 of the power supply voltage Vbatt to be adjusted using the compensation gain K2 in the situation that power supply voltage Vbatt varies according to the status of the steering operation. Changes in the compensation gain K2 are set to be opposite to changes in the limiting angular velocity ωlim based on an increase in the steering angle θs. That is, for the power supply compensation component ΔVqcomp, in a situation where the compensation basic component ΔVq0 significantly changes as a result of a decrease in the limiting angular velocity ωlim, changes in the compensation gain K2 are set to be significantly changeable so as to follow such changes in the compensation basic component ΔVq0. (FIG. 5 and FIG. 6)

That is, the steering-angular-velocity limiting circuit 61 suppresses the motor rotational angular velocity ωm of the motor 21 at the time of end abutment, that is, compensates for (corrects) the q-axis voltage command value Vq* so as to attenuate and make the steering angular velocity ωs closer to the limiting angular velocity ωlim calculated based on the current steering angle θs, using the compensation amount ΔVq calculated from the compensation basic component ΔVq0 and the power supply compensation component ΔVqcomp. When the q-axis voltage command value Vq* is compensated for (corrected), the compensation is achieved by taking into account even the status of the power supply voltage Vbatt of the battery 30, which fluctuates on a moment-to-moment basis, instead of simply making the steering angular velocity ωs closer to the limiting angular velocity ωlim.

Now, a process procedure will be described which is executed by the steering-angular-velocity limiting circuit 61 when compensating for the q-axis voltage command value Vq* to derive the compensation q-axis voltage command value Vq**. For each reception of the q-axis voltage command value Vq* (at each predetermined control period), the steering-angular-velocity limiting circuit 61 executes the following process.

Figure 6:
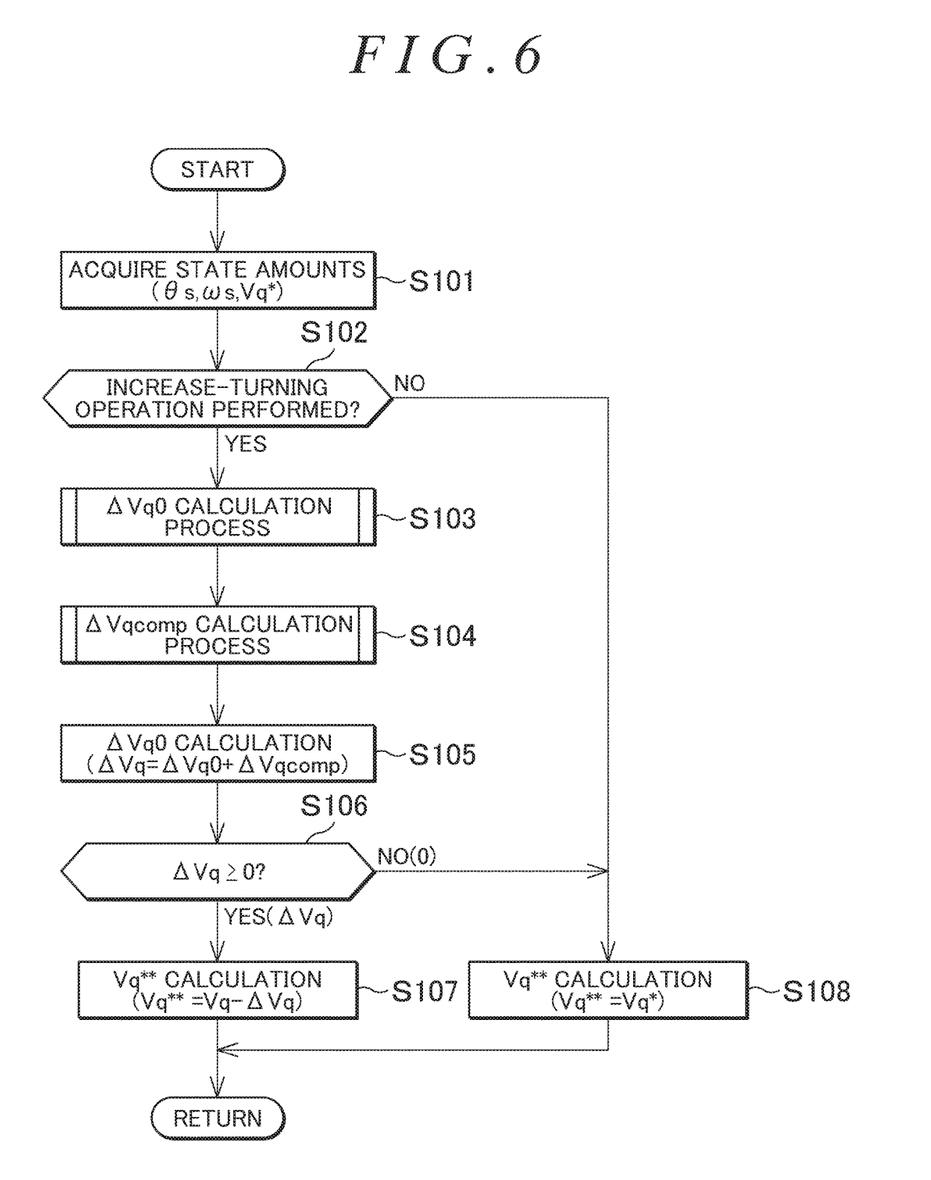
FIG. 6 is a flowchart illustrating a process procedure in which a steering-angular-velocity limiting circuit calculates a compensation q-axis voltage command value.

As depicted in FIG. 6, the steering-angular-velocity limiting circuit 61 acquires the state amounts such as the steering angle θs, the steering angular velocity ωs, and the q-axis voltage command value Vq* at a predetermined timing (step S101), and determines whether or not the increase-turning operation is being performed by steering operation based on the steering angle θs and the steering angular velocity ωs (step S102). In step S102, the steering-angular-velocity limiting circuit 61 determines whether or not the signs (a steering direction of the steering wheel 2) of the steering angle θs and the steering angular velocity ωs are identical. When the signs of the steering angle θs and the steering angular velocity ωs are not identical (step S102: NO), the steering-angular-velocity limiting circuit 61 determines that the increase-turning operation is not being performed and executes a Vq calculation that determines the compensation q-axis voltage command value Vq to be the previously received q-axis voltage command value Vq* without compensating for the q-axis voltage command value Vq* (step S108). Subsequently, the steering-angular-velocity limiting circuit 61 outputs the q-axis voltage command value Vq* as the compensation q-axis voltage command value Vq**.

On the other hand, in step S102, when the signs of the steering angle θs and the steering angular velocity ωs are identical (step S102: YES), the steering-angular-velocity limiting circuit 61 determines that the increase-turning operation is being performed. Subsequently, in the steering-angular-velocity limiting circuit 61, the basic-component generation circuit 70 executes a ΔVq0 calculation process to generate (derive) the compensation basic component ΔVq0 (step S103). The power supply compensation component generation circuit 80 executes a ΔVqcomp calculation process to generate (derive) the power supply compensation component ΔVqcomp (step S104).

Figure 7:
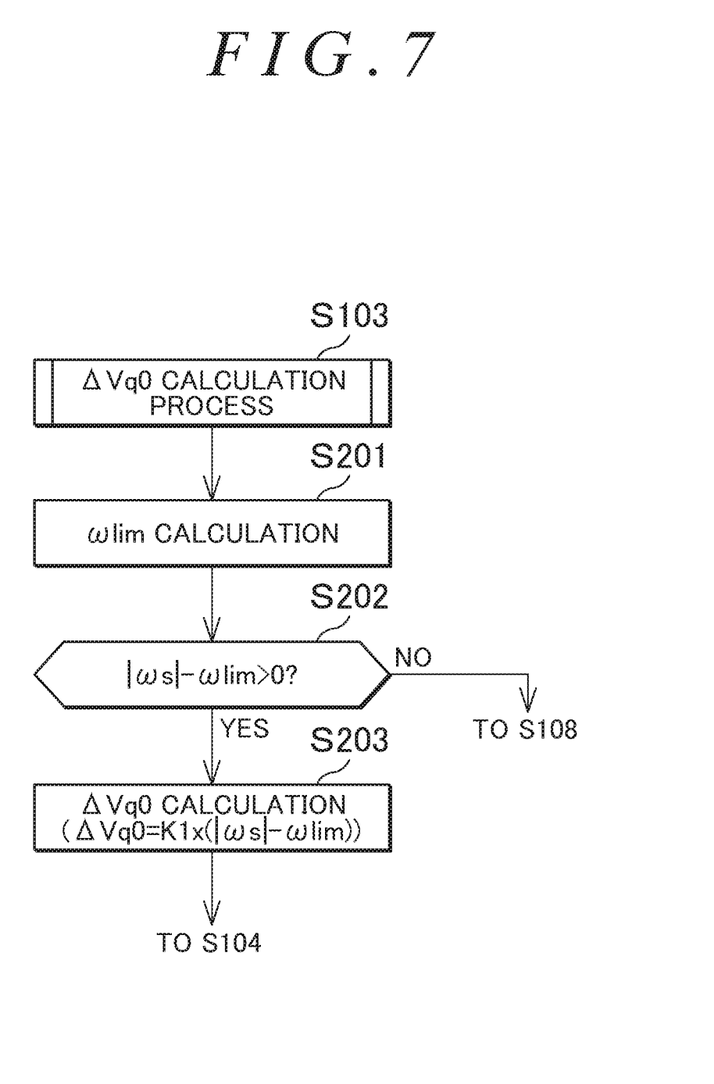
FIG. 7 is a flowchart illustrating a process procedure in which the steering-angular-velocity limiting circuit calculates a compensation basic component.

Now, the ΔVq0 calculation process (step S103) will be described in detail. As depicted in FIG. 7, the basic-component generation circuit 70 in the steering-angular-velocity limiting circuit 61 executes a ωlim calculation (step S201). In step S201, the basic-component generation circuit 70 calculates the limiting angular velocity ωlim based on the absolute value of the previously received steering angle θs and the steering angle-limiting angular velocity map 71.

Subsequently, in the basic-component generation circuit 70, the calculation circuit 72 calculates the absolute value |ωs| of the previously received steering angular velocity ωs, and the calculation circuit 73 calculates a difference (|ωs|−ωlim) between the absolute value |ωs| and the previously calculated limiting angular velocity ωlim. The basic-component generation circuit 70 then determines whether or not a result of the calculation is larger than zero (step S202). In step S202, the basic-component generation circuit 70 determines whether or not the q-axis voltage command value Vq* needs to be compensated for. That is, when the difference (|ωs|−ωlim) between the absolute value |ωs| and the limiting angular velocity ωlim is smaller than zero (step S202: NO), the basic-component generation circuit 70 determines that the steering angular velocity ωs has not reached the previously calculated limiting angular velocity ωlim and that the steering angular velocity ωs need not be suppressed by compensation. The basic-component generation circuit 70 thus ends the ΔVq0 calculation process. Subsequently, the steering-angular-velocity limiting circuit 61 executes a Vq calculation that determines the compensation q-axis voltage command value Vq to be the previously received q-axis voltage command value Vq* without compensating for the q-axis voltage command value Vq*. The steering-angular-velocity limiting circuit 61 then outputs the q-axis voltage command value Vq* as the compensation q-axis voltage command value Vq**.

On the other hand, in step S202, when the difference (|ωs|−ωlim) between the absolute value |ωs| and the limiting angular velocity ωlim is larger than zero (step S202: YES), the basic-component generation circuit 70 determines that the steering angular velocity ωs has reached the previously calculated limiting angular velocity ωlim and that the steering angular velocity ωs needs to be suppressed by compensation. In this case, in the basic-component generation circuit 70, the calculation circuit 73 calculates the compensation basic component ΔVq0 (K1×(|ωs|−ωlim)) by multiplying the difference (|ωs|−ωlim) between the previously calculated absolute value |ωs| and the previously calculated limiting angular velocity ωlim by the compensation gain K1 (step S203). The basic-component generation circuit 70 then ends the ΔVq0 calculation process. Subsequently, the steering-angular-velocity limiting circuit 61 shifts to the ΔVqcomp calculation process (step S104).

Figure 8:
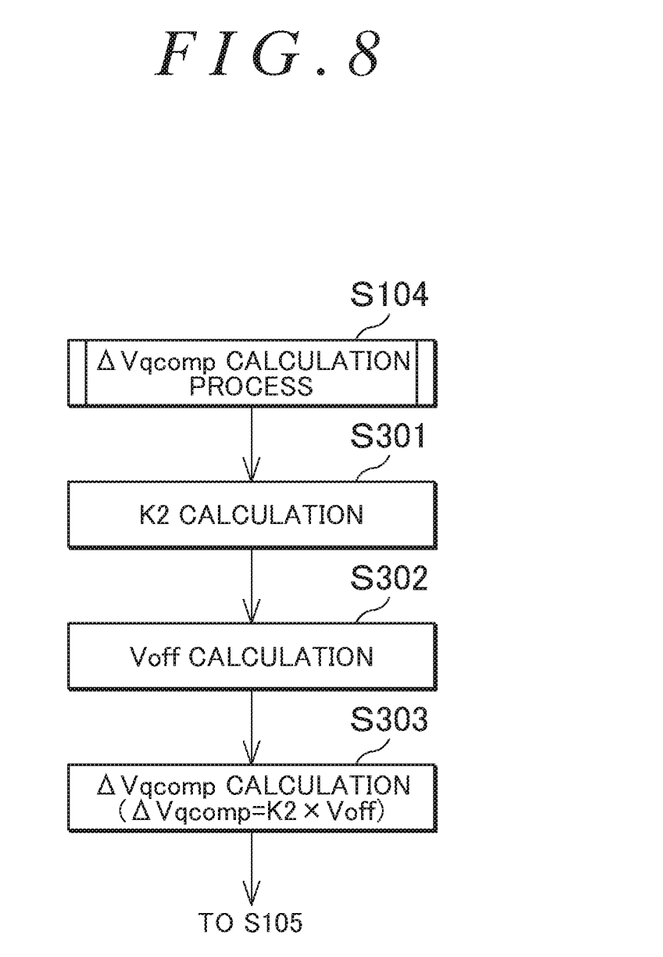
FIG. 8 is a flowchart illustrating a process procedure in which the steering-angular-velocity limiting circuit calculates a power supply compensation component.

Now, the ΔVqcomp calculation process (step S104) will be described in detail. As depicted in FIG. 8, the power supply compensation component generation circuit 80 in the steering-angular-velocity limiting circuit 61 executes a K2 calculation (step S301). In step S301, the power supply compensation component generation circuit 80 calculates the compensation gain K2 based on the previously received steering angle θs and the steering angle-compensation gain map 81.

Subsequently, in the power supply compensation component generation circuit 80, the calculation circuit 84 calculates the amount of offset of the power supply voltage Vbatt from the reference voltage 82 (Vbatt−BaseV), and the calculation circuit 85 calculates the q-axis offset voltage Voff (step S302).

Subsequently, in the power supply compensation component generation circuit 80, the calculation circuit 86 calculates (derives) the power supply compensation component ΔVqcomp (K2×Voff) by multiplying the previously calculated q-axis offset voltage Voff by the compensation gain K2 (step S303). The power supply compensation component generation circuit 80 then ends the ΔVqcomp calculation process. Subsequently, the steering-angular-velocity limiting circuit 61 shifts to the ΔVq calculation (step S105).

In step S105, in the steering-angular-velocity limiting circuit 61, the calculation circuit 62 calculates the compensation amount ΔVq(ΔVq0+ΔVqcomp) by adding the previously calculated compensation basic component ΔVq0 and the power supply compensation component ΔVqcomp together.

Subsequently, in the steering-angular-velocity limiting circuit 61, the ΔVq determination calculation circuit 63 determines whether or not the compensation amount ΔVq is equal to or larger than zero (step S106). In step S106, the steering-angular-velocity limiting circuit 61 determines whether or not to compensate for the q-axis voltage command value Vq* taking the status of the power supply voltage Vbatt into account. That is, when the compensation amount ΔVq is smaller than zero (step S106: NO), the steering-angular-velocity limiting circuit 61 determines to enhance the steering angular velocity ωs even though the steering angular velocity ωs needs to be suppressed. In this case, the steering-angular-velocity limiting circuit 61 executes a Vq calculation that determines the compensation q-axis voltage command value Vq to be the previously received q-axis voltage command value Vq* without compensating for the q-axis voltage command value Vq* (step S108). The steering-angular-velocity limiting circuit 61 then outputs the q-axis voltage command value Vq* as the compensation q-axis voltage command value Vq**. That is, in this case, the steering-angular-velocity limiting circuit 61 indicates a compensation amount ΔVq of zero, that is, no compensation needed.

On the other hand, in step S106, when the compensation amount ΔVq is equal to or larger than zero (step S106: YES), the steering-angular-velocity limiting circuit 61 determines that the steering angular velocity ωs needs to be suppressed. In this case, in the steering-angular-velocity limiting circuit 61, the calculation circuit 64 calculates the absolute value Vq of the previously received q-axis voltage command value Vq*, and the calculation circuit 65 executes a Vq calculation that subtracts the previously calculated compensation amount ΔVq from the absolute value Vq (step S107). The steering-angular-velocity limiting circuit 61 then outputs a result of the calculation as the compensation q-axis voltage command value Vq (Vq−ΔVq). That is, in this case, the steering-angular-velocity limiting circuit 61 applies the compensation amount ΔVq to compensation.

The above-described EPS 1 produces effects described below in (1) to (6). (1) When the steering operation corresponds to a steering angle that is close to the maximum steering angle (steering end), the steering-angular-velocity limiting circuit 61 generates the motor control signal Sm based on the compensation q-axis voltage command value Vq** for compensation corresponding to a reduction in the absolute value of the q-axis voltage command value Vq*. Then, a voltage applied to the motor 21 is reduced. The motor rotational angular velocity ωm is proportional to the voltage applied to the motor 21, and is thus reduced by the compensation for the q-axis voltage command value Vq* as described above. The thus reduced motor rotational angular velocity ωm is transmitted to the steering shaft 3 coupled to the motor 21 via the speed reducing mechanism 22 so as to suppress the steering angular velocity ωs of the steering generated on the steering wheel 2.

Of course, the voltage applied to the motor 21 is originally the power supply voltage Vbatt of the battery 30. The power supply voltage Vbatt of the battery 30 fluctuates depending on whether the vehicle is in an engine idling state or is traveling, the usage of electric components such as an air conditioner, and the like. Such a fluctuation in the power supply voltage Vbatt may affect the q-axis voltage command value Vq*. This is because the steering angular velocity ωs is proportional to the voltage applied to the motor 21. For example, when the power supply voltage Vbatt is higher than a designed and estimated value (12 V, to which the reference voltage 82 is set), a voltage that can be supplied as the voltage applied to the motor 21 is also increased.

If the available voltage is thus increased, an attempt to maintain the effect of mitigating the impact of end abutment hinders sufficient suppression of the motor rotational angular velocity ωm, that is, the steering angular velocity ωs of the steering generated on the steering wheel 2 unless the q-axis voltage command value Vq* can be compensated for by an extra amount equal to the increase in the available voltage compared to the q-axis voltage command value Vq* obtained before the increase. A difference corresponding to the increase in the voltage that fails to be sufficiently suppressed remains as a steady-state deviation when the q-axis voltage command value Vq* is generated by current feedback based on the proportional control.

In this regard, the power supply compensation component generation circuit 80 determines the power supply compensation component ΔVqcomp to be a positive value through the ΔVqcomp calculation process (step S104) when the power supply voltage Vbatt is higher than the designed and estimated value (12 V, to which the reference voltage 82 is set). In this case, given that the absolute value of the steering angle θs is equal to or larger than the predetermined steering angle θsth and that the steering operation corresponds to a steering angular velocity ωs exceeding the current limiting angular velocity ωlim, the basic-component generation circuit 70 determines the compensation basic component ΔVq0 through the ΔVq0 calculation process (step S103) to suppress the steering angular velocity ωs.

The power supply compensation component ΔVqcomp which is obtained through the ΔVqcomp calculation process and which is a positive value is added to the compensation basic component ΔVq0 through the ΔVq calculation (step S105). Thus, when the power supply voltage Vbatt is higher than the reference voltage 82, the compensation amount ΔVq is larger than that in the case where the power supply voltage Vbatt is lower than the reference voltage 82, increasing the amount by which steering angular velocity ωs is reduced.

Thus, even if the power supply voltage Vbatt fluctuates to increase above the reference voltage 82, when the steering angle θs is equal to or larger than the predetermined steering angle θsth, which is close to the maximum steering angle, the adverse effect, on the q-axis voltage command value Vq*, of the power supply voltage Vbatt fluctuating to increase above the reference voltage 82 can be suppressed by compensation (correction) based on the compensation amount ΔVq.

That is, in this case, adjustment can be made to obtain the compensation amount ΔVq needed to produce an expected compensation result before the q-axis voltage command value Vq* is increased due to the power supply voltage Vbatt higher than the reference voltage 82. Consequently, the increase in the q-axis voltage command value Vq* is restrained from remaining as a steady-state deviation. This also eliminates the need to take the adverse effect of a fluctuation in the power supply voltage Vbatt into account at an initial design and estimation stage, suppressing a decrease in the degree of freedom of design. Therefore, the q-axis voltage command value Vq* can be suitably compensated for regardless of a fluctuation in the power supply voltage Vbatt.

(2) On the other hand, when the power supply voltage Vbatt is lower than the designed and estimated value (12V, to which the reference voltage 82 is set), the voltage available as the voltage applied to the motor 21 is reduced.

When the available voltage is thus reduced, the motor rotational angular velocity ωm, that is, the steering angular velocity ωs of the steering generated on the steering wheel 2, is excessively suppressed unless the q-axis voltage command value Vq* can be compensated for by an amount equal to the reduction in the available voltage compared to the q-axis voltage command value Vq* obtained before the reduction. This makes the steering operation uncomfortable for the driver.

In this regard, when the power supply voltage Vbatt is lower than the designed and estimated value (12 V, to which the reference voltage 82 is set), the power supply compensation component generation circuit 80 determines the power supply compensation component ΔVqcomp to be a negative value through the ΔVqcomp calculation process. In this case, given that the absolute value of the steering angle θs is equal to or larger than the predetermined steering angle θsth and that the steering operation corresponds to a steering angular velocity ωs exceeding the current limiting angular velocity ωlim, the basic-component generation circuit 70 determines the compensation basic component ΔVq0 through the ΔVq0 calculation process to suppress the steering angular velocity ωs.

The power supply compensation component ΔVqcomp obtained through the ΔVqcomp calculation process and which is a negative value is subtracted from the compensation basic component ΔVq0 through the ΔVq calculation so as to suppress the compensation basic component ΔVq0. Thus, when the power supply voltage Vbatt is lower than the reference voltage 82, the compensation amount ΔVq is smaller than that in the case where the power supply voltage Vbatt is equal to or higher than the reference voltage 82, decreasing the amount by which steering angular velocity ωs is reduced.

Thus, even if the power supply voltage Vbatt fluctuates to decrease below the reference voltage 82, when the steering angle θs is equal to or larger than the predetermined steering angle θsth, which is close to the maximum steering angle, the adverse effect, on the q-axis voltage command value Vq*, of the power supply voltage Vbatt fluctuating to decrease below the reference voltage 82 can be suppressed by compensation (correction) based on the compensation amount ΔVq. Therefore, the q-axis voltage command value Vq* can be suitably compensated for regardless of a fluctuation in the power supply voltage Vbatt.

(3) In the ΔVqcomp calculation process, timely compensation can be performed according to a change in the steering angle θs from a time when the absolute value of the steering angle θs is equal to or larger than the predetermined steering angle θsth, which is close to the maximum steering angle, that is, a time before the absolute value of the steering angle θs reaches the maximum steering angle, until a time when the steering angle reaches the maximum steering angle.

(4) In the ΔVq0 calculation process, calculation is executed such that, when the absolute value of the steering angle θs is equal to or larger than the predetermined steering angle θsth, which is close to the maximum steering angle, the compensation basic component ΔVq0 increases based on an increase in the absolute value of the steering angle θs. In the ΔVqcomp calculation process, calculation is executed such that, when the absolute value of the steering angle θs is equal to or larger than the predetermined steering angle θsth, which is close to the maximum steering angle, the power supply compensation component ΔVqcomp increases based on an increase in the steering angle θs. In this case, a situation where the compensation basic component ΔVq0 changes to increase can be correlated with a situation where the power supply compensation component ΔVqcomp changes to increase. Thus, even when the power supply voltage Vbatt higher than the reference voltage 82 increases the q-axis voltage command value Vq* itself in a situation where the compensation basic component ΔVq0 increases, the increase in the q-axis voltage command value Vq* can be compensated for in a situation where the power supply compensation component ΔVqcomp increases. Therefore, the q-axis voltage command value Vq* can be suitably compensated for regardless of a fluctuation in the power supply voltage Vbatt.

(5) Fluctuations in the power supply voltage Vbatt assumed in the present embodiment range from such subtle fluctuations that do not affect the steering feeling involved in the steering operation to such significant fluctuations that affect the steering feeling involved in the steering operation. However, if every such subtle fluctuation that does not affect the steering feeling involved in the steering operation is compensated for, the steering feeling involved in the steering operation may be affected.

In this regard, the power supply voltage Vbatt used for the ΔVqcomp calculation process is filtered by the LPF 83. Thus, the power supply compensation component ΔVqcomp is reflected in the compensation amount ΔVq as an effect on steady-state changes in the power supply voltage Vbatt, allowing possible subtle fluctuations in the power supply compensation component ΔVqcomp to be inhibited. When possible subtle fluctuations are inhibited, a useless increase in the compensation gain K2 can be suppressed, allowing execution of useless compensation to be inhibited. This suppresses the adverse effect on the steering feeling involved in the steering operation, while allowing the q-axis voltage command value Vq* to be suitably compensated for regardless of a fluctuation in the power supply voltage Vbatt.

(6) The limiting angular velocity ωlim may be set closer to the steering angular velocity ωs estimated for the actual steering operation to increase the accuracy of determination of whether or not to make compensation based on the compensation basic component ΔVq0. In this case, the steering angular velocity ωs itself originally has the characteristic of being easily vibrated, and thus, the result of the determination in step S202 (YES or NO) is expected to be quickly switched.

In this regard, in the ΔVqcomp calculation process, the power supply compensation component ΔVqcomp is calculated regardless of the difference between the absolute value of the steering angular velocity ωs and the limiting angular velocity ωlim. Thus, even while the steering angular velocity ωs is vibrating, the power supply compensation component ΔVqcomp is calculated regardless of the vibration. Therefore, a possible situation where the appropriate compensation is not made when needed can be avoided, allowing stabilization of reflection of the compensation based on the power supply compensation component ΔVqcomp.

The above-described embodiment may be modified as follows.

Effects similar to the effects of the above-described embodiment are also produced when the q-axis voltage command value Vq* is calculated by current feedback under proportional-derivative control (so-called PD control) rather than under the proportional control (so-called P control).

The predetermined steering angle that is close to the maximum steering angle may vary between the steering angle-limiting angular velocity map 71 and the steering angle-compensation gain map 81. For example, when the predetermined steering angle θsth in the steering angle-compensation gain map 81 is set smaller than the predetermined steering angle θsth in the steering angle-limiting angular velocity map 71, it is possible to flexibly accomplish such functional enhancement that compensates for the adverse effect of a fluctuation in the power supply voltage Vbatt in situations other than end abutment.

In the power supply compensation component generation circuit 80, that is, in the ΔVqcomp calculation process, at least the power supply compensation component ΔVqcomp may be calculated when the power supply voltage Vbatt is higher than the reference voltage 82. The effect in (1) in the above-described embodiment can be produced by enabling at least a situation to be dealt with in which, at the time of end abutment, the compensation amount ΔVq becomes insufficient as a result of a fluctuation in the power supply voltage Vbatt.

The above-described embodiment may have at least the power supply compensation component generation circuit 80, that is, the ΔVqcomp calculation process, and instead of the basic-component generation circuit 70, may perform torque reduction compensation that reduces a torque generated by the motor 21 based on an increase in the absolute value of the steering angle θs, thus mitigating impact exerted at the time of end abutment. In addition, for the compensation basic component ΔVq0, the manner of the calculation may be changed. For example, the compensation basic component ΔVq0 may have a predetermined value.

For the ΔVq0 calculation process and the ΔVqcomp calculation process, the system may be internally provided with arithmetic expressions for calculating the limiting angular velocity ωlim and the compensation gain K2 based on the absolute value of the steering angle θs such that the calculations are executed using the arithmetic expressions.

In the steering angle-compensation gain map 81, changes may be represented as a smooth curve or steps and need not be opposite to changes indicated by the steering angle-limiting angular velocity map 71. In another example, in the steering angle-compensation gain map 81, the compensation gain K2 need not be largest when the absolute value of the steering angle θs corresponds to the maximum steering angle. Such changes may be applied to the steering angle-limiting angular velocity map 71.

The power supply compensation component generation circuit 80 may be implemented without incorporation of the LPF 83. In this case, for example, the reference voltage 82 may be set higher than 12 V to make subtle fluctuations in the power supply voltage Vbatt difficult to detect.

The reference voltage 82 may be set different from the voltage estimated for the situation during engine idling illustrated in the above-described embodiment. That is, when the reference voltage 82 is set higher than the voltage estimated for the situation during engine idling (for example, 13 V), the range of situations to which the power supply compensation component ΔVqcomp is applied can be limited as described above in another example. On the other hand, when the reference voltage 82 is set lower than the voltage estimated for the situation during engine idling (for example, 10 V), the range of situations to which the power supply compensation component ΔVqcomp is applied can be extended, enabling compensation for the adverse effect of a fluctuation in the power supply voltage Vbatt in situations other than end abutment. That is, adjustment of the reference voltage 82 allows applications in various situations to be flexibly dealt with.

As a technique for limiting the range of application situations as described above, besides the technique of setting the reference voltage 82 higher than the voltage estimated for the situation during engine idling, a process corresponding to step S202 for the ΔVq0 calculation process may be incorporated as a process succeeding step 301 for the ΔVqcomp calculation process. This process allows construction of a system specialized for the adverse effect, on the q-axis voltage command value Vq*, of a fluctuation in the power supply voltage Vbatt at the time of end abutment.

The steering angle θs may be estimated based on a steering neutral position and the motor rotation angle θm detected by the rotation angle sensor 24. Alternatively, a pinion angle of the pinion shaft 10 may be detected as the steering angle θs.

The steering angular velocity ωs may be detected in a different manner, for example, by differentiating the steering angle θs detected by the steering sensor 26. The steering-angular-velocity limiting circuit 61 may compensate for the q-axis voltage command value Vq* regardless of whether or not the increase-turning operation is being performed.

In the above-described embodiment, the minimum value of the compensation amount ΔVq is zero (the function of the ΔVq determination calculation circuit 63 and step S106). However, the invention is not limited to this configuration. Correction of the q-axis voltage command value Vq* may result in inversion of the sign such that the q-axis voltage command value Vq* has a sign opposite to the sign of the compensation q-axis voltage command value Vq**. In this case, application of a voltage that reverses the direction of rotation of the motor 21 suppresses the motor rotational angular velocity ωm.

In the above-described embodiment, the three current sensors 43u, 43v, and 43w are used. However, the invention is not limited to this configuration. The phase current values Iu, Iv, and Iw may be detected using two current sensors (for example, the current sensors 43u and 43v).

In the above-described embodiment, the change process in following deviations at the time of end abutment can also be effectively adjusted by calculating the q-axis voltage command value Vq* using current feedback under proportional-integral-derivative control (so-called PID control) that involves no steady-state deviation.

In the above-described embodiment, the EPS 1 is embodied as a column type EPS actuator but may be applied to a rack (assist) type EPS actuator or a pinion (assist) type EPS actuator.

In the above-described embodiment, as the motor 21, which is a driving source for the EPS actuator 20, any type of motor may be adopted such as an induction motor or a stepping motor. The configuration of the above-described embodiment is not limited to the electric power steering system but may be applicable to, for example, a steer-by-wire steering system.

What is claimed is:
1. A steering system comprising:
a steering mechanism that is configured to steer steered wheels based on steering of a steering wheel;
a motor that is configured to allow the steering mechanism to generate a turning torque that turns the steered wheels;
a power supply that is configured to serve as a source of a voltage applied to the motor;
a power supply voltage detection circuit that is configured to detect a power supply voltage of the power supply;
a steering angle detection circuit that is configured to detect a steering angle formed at the steering mechanism;
a calculation circuit that is configured to calculate a voltage command value to allow the motor to generate a predetermined turning torque;
a motor control signal generation circuit that is configured to generate a motor control signal to apply a portion of the power supply voltage, which is indicated by the voltage command value, to the motor;
a compensation circuit that is configured to calculate a compensation amount including at least a power supply compensation component as one of a plurality of components for compensation for the voltage command value, the compensation circuit deriving the compensation amount by executing calculation for the power supply compensation component based on the power supply voltage when the steering angle is equal to or larger than a predetermined steering angle that is close to a maximum steering angles and
a current command value calculation circuit that is configured to calculate a current command value, wherein the motor control signal generation circuit that is configured to calculate the voltage command value by performing current feedback control that allows an actual current value to follow the current command value.

2. The steering system according to claim 1, wherein the compensation circuit is configured to calculate the power supply compensation component so as to vary the compensation amount based on the steering angle.

3. The steering system according to claim 1, further comprising:
   a steering-angular-velocity detection circuit that is configured to detect a steering angular velocity of steering generated on the steering mechanism; and
   a limiting-angular-velocity calculation circuit that is configured to calculate a limiting angular velocity serving as an upper limit of the steering angular velocity accepted, according to the steering angle, wherein
   the limiting-angular-velocity calculation circuit is configured to calculate the limiting angular velocity so as to reduce the limiting angular velocity based on an increase in the steering angle, and
   when the steering angular velocity is higher than the limiting angular velocity, the compensation circuit is configured to derive the compensation amount by calculating a compensation basic component for compensation for the voltage command value and adding the power supply compensation component to the compensation basic component, to reduce a rotational angular velocity of the motor.

4. The steering system according to claim 2, further comprising:
   a steering-angular-velocity detection circuit that is configured to detect a steering angular velocity of steering generated on the steering mechanism; and
   a limiting-angular-velocity calculation circuit that is configured to calculate a limiting angular velocity serving as an upper limit of the steering angular velocity accepted, according to the steering angle, wherein
   the limiting-angular-velocity calculation circuit is configured to calculate the limiting angular velocity so as to reduce the limiting angular velocity based on an increase in the steering angle, and
   when the steering angular velocity is higher than the limiting angular velocity, the compensation circuit is configured to derive the compensation amount by calculating a compensation basic component for compensation for the voltage command value and adding the power supply compensation component to the compensation basic component, to reduce a rotational angular velocity of the motor.

5. The steering system according to claim 3, further comprising:
   a difference detection circuit that detects a difference voltage between the power supply voltage and a predetermined reference voltage, wherein
   the compensation circuit is configured to calculate the power supply compensation component such that the power supply compensation component increases based on an increase in the steering angle when the difference voltage has a positive value.

6. The steering system according to claim 3, wherein the compensation circuit is configured to calculate the compensation basic component such that the limiting angular velocity decreases based on an increase in the steering angle when the steering angle is equal to or larger than the predetermined steering angle that is close to the maximum steering angle.

7. The steering system according to claim 5, wherein the compensation circuit is configured to calculate the compensation basic component such that the limiting angular velocity decreases based on an increase in the steering angle when the steering angle is equal to or larger than the predetermined steering angle that is close to the maximum steering angle.

* * * * *